United States Patent
Orr (10) Patent No.: US 8,022,956 B2
(45) Date of Patent: Sep. 20, 2011

(54) SETTINGS CONTROL IN DEVICES COMPRISING AT LEAST TWO GRAPHICS PROCESSORS

(75) Inventor: Stephen J. Orr, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 929 days.

(21) Appl. No.: 11/956,061

(22) Filed: Dec. 13, 2007

(65) Prior Publication Data

US 2009/0153528 A1 Jun. 18, 2009

Related U.S. Application Data

(60) Provisional application No. 61/013,527, filed on Dec. 13, 2007.

(51) Int. Cl.
*G09G 5/00* (2006.01)
(52) U.S. Cl. ........................................................ 345/502
(58) Field of Classification Search .................. 345/204, 345/502–506; 703/23, 24, 26; 709/223, 709/230; 718/105, 107; 370/392, 394
See application file for complete search history.

(56) References Cited

U.S. PATENT DOCUMENTS

| 7,623,131 B1 * | 11/2009 | Johnson .......................... 345/502 |
| 7,743,376 B2 * | 6/2010 | Selvaggi et al. ................ 718/100 |
| 7,768,518 B2 * | 8/2010 | Collins et al. .................. 345/505 |
| 2006/0007203 A1 | 1/2006 | Chen et al. |

FOREIGN PATENT DOCUMENTS

| WO | 0022501 | 4/2000 |
| WO | 2007085963 A3 | 8/2007 |
| WO | 2007140404 A2 | 12/2007 |
| WO | 2008027328 A1 | 3/2008 |
| WO | 2008027975 A3 | 3/2008 |

OTHER PUBLICATIONS

International Search Report issued May 5, 2009 in PCT/CA2008/002185.

* cited by examiner

*Primary Examiner* — Abbas Abdulselam
(74) *Attorney, Agent, or Firm* — Vedder Price PC (57) ABSTRACT

In a device comprising at least two graphics processors, a determination is made that the device has switched from a first or current graphics processor to a second or target graphics processor. At least a portion of settings corresponding to the first graphics processor are identified for application to the second graphics processor, and settings of the second graphics processor are updated based on these transferable settings. The transferable settings may be identified based on a change indicator(s) that signals which settings corresponding to the first graphics processor have been changed. Where necessary, certain ones of the transferable settings may have a translation or transformation applied thereto. Subsequent transitions in the active graphics processor may cause a similar transfer of settings to occur. In one embodiment, transitions between graphics processors may be caused by a change in power condition of the device.

40 Claims, 5 Drawing Sheets

SETTINGS CONTROL IN DEVICES COMPRISING AT LEAST TWO GRAPHICS PROCESSORS

CROSS-REFERENCE TO RELATED APPLICATION

The instant application is related to co-pending U.S. Patent Application Ser. No. 61/013,527, filed on Dec. 13, 2007.

FIELD OF THE INVENTION

The present invention relates generally to control of settings used by graphics processors and, in particular, to techniques for controlling such settings in devices comprising at least two graphics processors.

BACKGROUND OF THE INVENTION

With the ever increasing power demands of high-end, discrete graphics processors, it is becoming increasingly difficult to design battery-powered devices (e.g., laptop computers, wireless communication devices such as cellular telephones, personal digital assistants, etc.) with a long battery life. Even where techniques are employed to reduce power drain during standby periods, such graphics processors still require significant power consumption. While there is a strong market for premium devices that can deliver high performance, there is also a need to sacrifice significant amounts of this performance while running on batteries.

One solution to this problem is technology that provides both a high-performance, discrete graphics processor and a more power efficient, integrated graphics processor. In such a configuration, the discrete graphics processor is typically employed when the device is connected to a non-battery power source, such as an alternating current (AC) wall outlet, whereas the integrated graphics processor is used when the device is running from batteries. In such a system the discrete graphics processor is completely powered down while not in use thereby allowing substantially extended battery life, albeit while sacrificing graphics performance. Examples of this are the PowerXpress™ solutions offered by the assignee of the instant invention.

In such a solution, the transition between integrated and discrete graphics processors is designed to be nearly or totally seamless. As a result, the end user is often not aware which graphics processor they are using at any given moment. This is especially true for applications that are not graphics-intensive. Such systems often also contain a software-based control panel that is employed by the user to adjust various settings or parameters related to overall display quality and performance.

Where the same or similar settings exist on both types of graphics processors, a user may be confused why a change made in the control panel for, say, the discrete graphics processor is not reflected in the control panel for the integrated graphics processor after the devices have been switched. The reasons for this situation fall within three different classes. Settings that are unique to one device or the other constitute the first class. For example, these are settings that are available only on the discrete graphics processor due to its additional performance capabilities, or, on the other hand, that are only available on the integrated graphics processor due to its added power conservation abilities. Settings that are identical on each device constitute the second class. The third class includes settings that are similar on each device but, due to the different capabilities of the graphics processors, the allowable range of values are different.

Additionally, in cases where the different graphics processors are produced by different vendors, there may be different control panel applications for each device. As a result, the end user may have difficulty in determining which control panel should be used to control the currently active graphics processor.

What is needed, therefore, is a method whereby appropriate settings from one graphics processor can be automatically applied (and as required, translated) to another graphics processor. In addition, it would be beneficial to ensure that the correct control panel application is opened when requested.

BRIEF DESCRIPTION OF THE DRAWINGS

The features of the present invention are set forth with particularity in the appended claims. The invention itself, together with further features and attendant advantages, will become apparent from consideration of the following detailed description, taken in conjunction with the accompanying drawings. One or more embodiments of the present invention is now described by way of example only, with reference to the accompanying drawings wherein like referenced numerals represent like elements and in which:

DETAILED DESCRIPTION OF THE PRESENT EMBODIMENTS

Briefly, the present invention provides techniques for handling graphics processor settings in devices comprising at least two graphics processors. In one embodiment of the present invention, it is determined that the device has switched from a first or current graphics processor to a second or target graphics processor. At least a portion of settings corresponding to the first graphics processor are identified for application to the second graphics processor, and settings of the second graphics processor are updated based on these transferable settings. Thereafter, the resulting updated settings may be used to provide display data. The transferable settings may be identified based on a change indicator(s) that signals which settings corresponding to the first graphics processor have been changed. Where necessary, certain ones of the transferable settings may have a translation or transformation applied thereto, with the resulting transformed settings used to update the settings of the second graphics processor. Subsequent transitions in the active graphics processor (i.e., back to the first graphics processor from the second graphics processor) may cause a similar transfer of settings to occur. In a presently preferred embodiment, transitions between graphics processors may be caused by a change in power condition of the device.

In another embodiment of the present invention, selection of a graphics processor control program or application is effected by determining a currently active graphics processor and instantiating a current graphics processor control program corresponding to the currently active graphics processor. The determination of the currently active graphics processor may be performed in response to a request to launch a graphics processor control program or in response to a transition from a first to a second graphics processor as in the case, for example, where a change in power condition of the device initiates the transition. Notification of the transition may be provided to a user of the device. In this manner, the present invention assures smooth transitions between graphics processors so as to provide an improved user experience.

Figure 1:
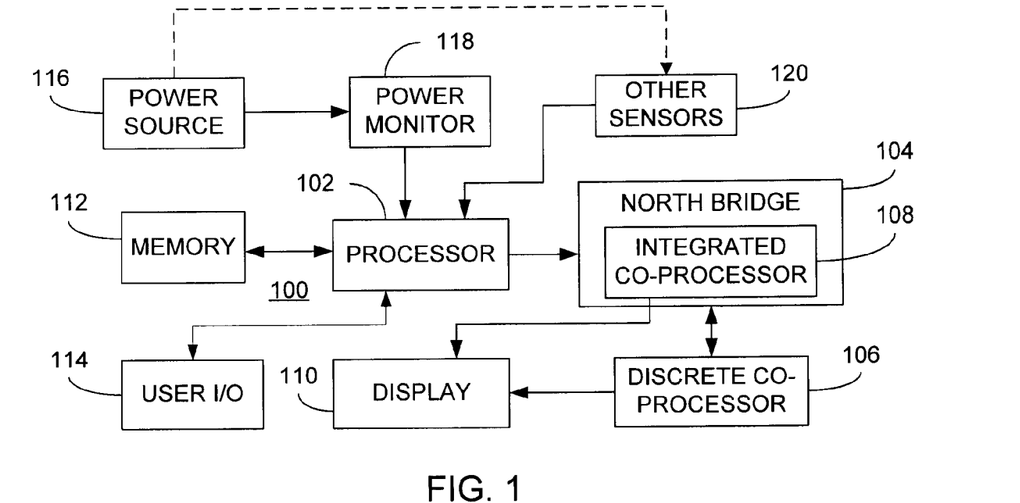
FIG. 1 is a schematic block diagram of an implementation of a device in accordance with the present invention.

Referring now to FIG. 1, a device 100 in accordance with the present invention is further illustrated. In particular, the device 100 comprises at least one processor 102 in communication with one or more memory devices 112. As used herein, a device may comprise virtually anything capable of displaying image (or display) data, such as a computer, a television, a mobile communication device such as a cellular telephone, etc. Typically, the processor 102 is an application or host processor that, as known in the art, generally controls operation of the device 100 and is often embodied in a microprocessor, microcontroller, digital signal processor or combination thereof that operates upon data, and under the control of executable instructions, stored in the memory devices 112. The memory devices 112 may comprise any combination of volatile and non-volatile memory, such as random-access memory (RAM), read-only memory (ROM), etc. Thus configured, the processor 102 can implement a wide array of functionality in the form of software programs including, for example, programs adapted to provide images (e.g., graphics, still images, video, etc.) to a display 110. The display 110 may be integral to the device 100 as in the case, for example, of a laptop computer, personal digital assistant, etc. Alternatively, or in addition, the display 110 may comprise an external display as in the case, for example of a desk top computer.

A power source 116 for the device 100 is provided as shown, and in the present preferred embodiment, is in communication with a power monitor 118 that, in turn, preferably provides data concerning a power condition of the device (e.g., generally, what type of power source is currently being employed; in a battery powered device, the rate at which the battery is discharging or the amount of stored charge left; or in an AC powered device, the rate at which power is being consumed) to the processor 102 (as shown) or a co-processor 106, 108 (not shown). Further still, in the case where the display 110 is not powered by the power source 116 for the device 100 (as in the case of a projector coupled to a battery powered laptop computer), the power source being monitored may include the power source for the display 110. Furthermore, other sensors 120 such as temperature sensors, vibration sensors, moisture sensors or other components known to those having skill in the art can also be provided. For example, a temperature sensor may be provided to monitor the temperature of the power source 116 (or one of the co-processors, described below) as illustrated by the dashed line. In this manner, temperature of the power source 116 (or other parameters depending on the nature of the specific sensor(s) 120) can also be used as an input when determining the power condition of the device.

As described above, the device 100 comprises at least two co-processors 106, 108 as described previously. As known in the art, such coprocessors are used to offload certain processing tasks from the processor 102 thereby allowing the processor 102 to handle other processing tasks. Although not shown in FIG. 1, the co-processor(s) 106, 108 may share the memory 112 with the processor 102 and/or use local memory accessible only to either or both of the co-processors 106, 108. In a presently preferred embodiment, the co-processors 106, 108 comprise graphics processors, as known in the art, although the present invention is not limited in this regard. Such co-processors 106, 108 may comprise a discrete graphics processor 106 and an integrated graphics processor 108, although other combinations may be possible. In many implementations of co-processors, particularly graphics co-processors, a bridge device between the processor 102, discrete co-processor 106 and memory or other devices (not shown) may be provided, such as a so-called Northbridge 104. As further known in the art, the integrated co-processor 108 is implemented as part of the Northbridge device 104. Alternatively, the integrated co-processor 108 may be implemented within the application or host processor 102.

In one aspect of the present invention, the co-processors 106, 108 are differentiated at least in terms of their respective power consumptions and performance. As noted previously, discrete graphics processors 106 typically offer more performance (i.e., the ability to handle more processing and/or to perform more sophisticated processing) at the expense of greater power consumption. On the other hand, integrated graphics processors 108 typically offer reduced power consumption at the expense of reduced performance. The different power consumption/performance characteristics of the discrete co-processor 106 versus the integrated co-processor 108 facilitates greater flexibility in meeting user performance and battery life demands. Alternatively, the co-processors 106, 108 may be differentiated on terms other than power consumption/performance, for example, the existence of different abilities or specialization associated with each co-processor 106, 108. For example, a user of a desktop or notebook computer may want to use the integrated co-processor 108 due to its lower fan noise even when AC power is used, but switch to the discrete co-processor 106 automatically when launching more demanding applications.

Finally, the device 100 may comprise one or more user input/output devices 114 in communication with the processor 102. Such devices are known in the art and include, but are not limited to, keyboards, keypads, pointer devices, buttons, microphones, touch screens, display screens, on-screen control panels, speakers, annunciators, or any other device or combinations thereof that allow the user of the device 100 to provide input to or receive output from the device 100.

Figure 2:
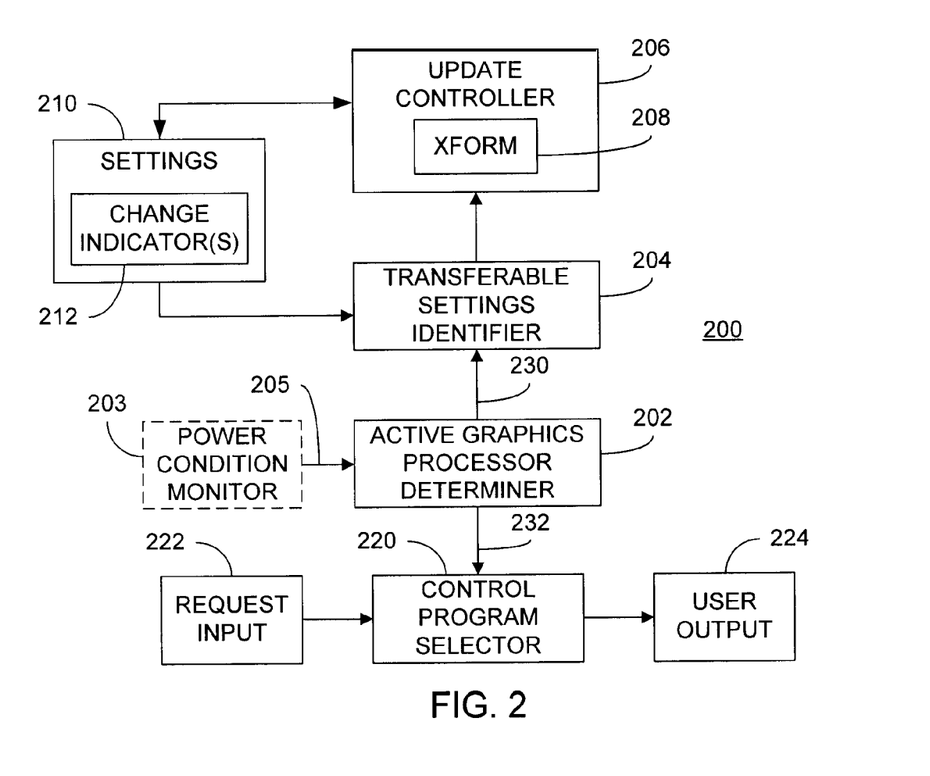
FIG. 2 is a schematic block diagram illustrating an embodiment of a device in accordance with the present invention.

Referring now to FIG. 2, a schematic block diagram of a device 200 in accordance with the present invention is further illustrated. In a presently preferred embodiment, the blocks illustrated in FIG. 2 are implemented using software applications or programs stored in a suitable storage device as executable instructions that are executed by a processor, such as the processor 102 illustrated in FIG. 1. However, it is understood that the blocks illustrated in FIG. 2 may be implemented using stored programs executed at least in part by another processor, such as the co-processors 106, 108 or using other techniques such as application-specific integrated circuits (ASIC), programmable logic arrays, or other implementation methodologies known to those having ordinary skill in the art. Additionally, although the description below makes specific reference to graphics processors, it is nevertheless understood that the present invention is not limited to such co-processors and may be equally applied to other types of co-processors.

As shown, the device 200 comprises an active graphics processor determiner 202 that operates to determine, when necessary or desired, which graphics processor of the at least two graphics processors is currently active. Techniques for making such a determination are known in the art and may comprise, for example, a status indicator stored in a suitable memory location or control register. Further still, in the case where the discrete and integrated co-processors 106, 108 are graphics co-processors provided by different vendors (as discussed in further detail below), there is a so-called "wedge" driver that routes drawing commands provided by the operating system to the currently active graphics co-processor. Because this driver understands and reports the current state, it may be used to ascertain the currently active co-processor. This solution may be equally applied to the single vendor case where a wedge driver is still provided, or the "wedge" may be embedded in a single, vendor-provided driver. Other techniques will be apparent to those of skill in the art.

In one embodiment of the present invention, the active graphics processor determiner 202 is coupled to a transferable settings identifier 204. The transferable settings identifier 204 is operative to identify at least the portion of settings 210 corresponding to the first graphics processor that may be applied to a second graphics processor. As used herein, settings refer to any user-configurable parameter that affects the manner in which a co-processor operates. For example, in the case of graphics processors, such settings may include the current resolution enabled by the graphics processor, the color depth used, the degree of anti-aliasing filtering to be performed, etc. As described in further detail below, such settings may be identical in function and range on each of the at least two co-processors, may be identical in function but not in range, or may be exclusive to one of the co-processors. The manner in which settings are transferred between co-processors, if at all, depends on their location within this continuum.

Figure 4:
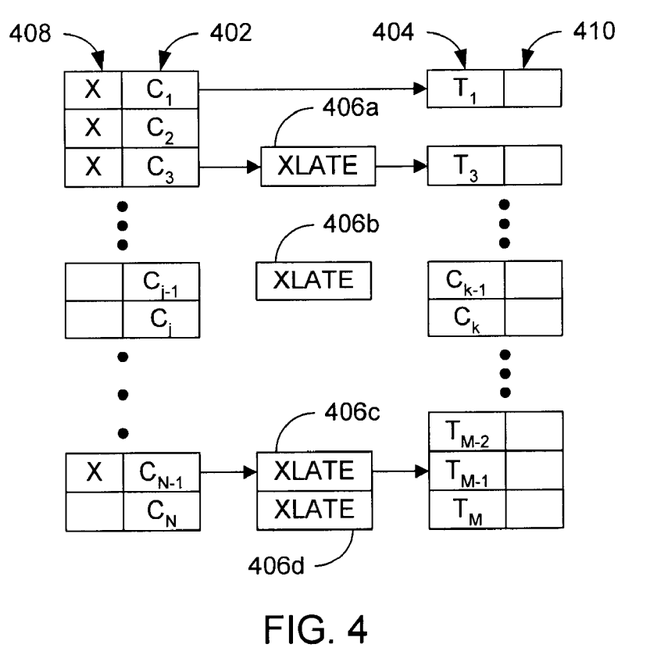
FIG. 4 is an exemplary illustration of processing of graphics processor setting in accordance with the present invention.

The transferable settings identifier 204 is responsive to a switch indicator 230 provided by the active graphics processor determiner 202. The switch indicator 230 identifies those instances in which a transition between co-processors (i.e., where support for the device 200 provided by the co-processors is shifted from one co-processor to another) is occurring, or is about to occur. The switch indicator 230 may be provided in response, for example, to a change in power state of a co-processor, e.g., where a first co-processor is powered up while another co-processor is removed from power, or to a change in power condition of the device 200 itself, e.g., where the device is switched to battery operation. Alternatively, such a transition may be detected in response to explicit commands provided, for example, by an application processor. Regardless, the transferable settings identifier identifies transferable setting in response to the switch indicator 230. For example, in a presently preferred embodiment, the transferable settings identifier 204 identifies the transferable settings based on one or more change indicators 212 associated with the settings for the first graphics processor. For example (as illustrated in FIG. 4), each setting associated with each graphics processor will have a corresponding flag 408, 410 associated therewith, which flag serves to indicate when a change has been made to a given parameter since the last transition between graphics processors. Those having skill in the art will appreciate that other techniques for identifying transferable settings may be equally employed. For example, rather than using explicit change flags, identifications of changed settings may be written to a log that is referenced when the switch indicator 230 is received. Alternatively, all possible settings may be transferred each time a switch occurs regardless of whether which settings, if any, have been changed. Further still, a complete record of the previous set of settings may be maintained and, when needed, compared to the current (potentially updated) settings to identify differences. In the case of more than two co-processors, the above-described solutions may quickly become complex. Thus, yet another approach is to associate a timestamp with the transferable controls. With the timestamp approach, a "last changed time" is associated with each change and, if the processor being enabled has an older timestamp on its changes, i.e., its changes are less recent, then it accepts the new settings.

Regardless of the manner in which transferable settings are identified, the transferable settings identifier 204 provides or otherwise identifies the transferable settings for use by the update controller 206. The update controller 206 causes the settings for the second or target graphics processor to be updated based at least in part upon the transferable settings. As described in further detail below, one or more of the transferable settings may require translation or transformation in order to be properly applied to the second graphics processor. To this end, the update controller 206 may comprise a transformation component 208 to perform any necessary transformations. Alternatively, the transformation component 208, rather than comprising a part of the update controller 206, may be implemented external to the update controller 206 as a matter of design choice.

In another embodiment of the present invention, the active graphics processor determiner 202 can provide an indication of a currently active graphics processor 232 to a control program selector 220. Once again, techniques for determining a currently active graphics processor are known in the art, including power state determinations, software driver determinations or explicit host instructions as described above. Responsive to the indication of the currently active graphics processor 232, the control program selector 220 is operative to instantiate a current graphics processor control program associated with the currently active graphics processor. In this manner, the appropriate graphics processor control program may be instantiated regardless of the graphics processor currently in use. As used herein, a graphics processor control program preferably comprises a control panel application or other program or application that allows a user of the device to configure settings relevant to the graphics processor with which the control program is associated. For example, the discrete co-processor 106 of FIG. 1 may have one control program associated with it, whereas the integrated co-processor 108 may have another, different control program associated therewith.

Additionally, a user output mechanism 224 (such as one of the user output devices 114 or the display 110 described above relative to FIG. 1) may be employed to provide a notification to a user of the device that the device has transition operation from the first graphics processor to the second graphics processor. For example, a message can be displayed on the display informing the user of the transition or an audible indication, such as a tone or chime, could be provided via a speaker. Techniques for providing such indications are well known in the art.

The control program selector may be additionally responsive to a request to launch a graphics processor control program received from a request input mechanism 222 (which may comprise one of the user input devices 114 described above). For example, a user-selectable display icon or other mechanism may be used such that selection by a user causes the request to be provided to the control program selector 220.

Figure 3:
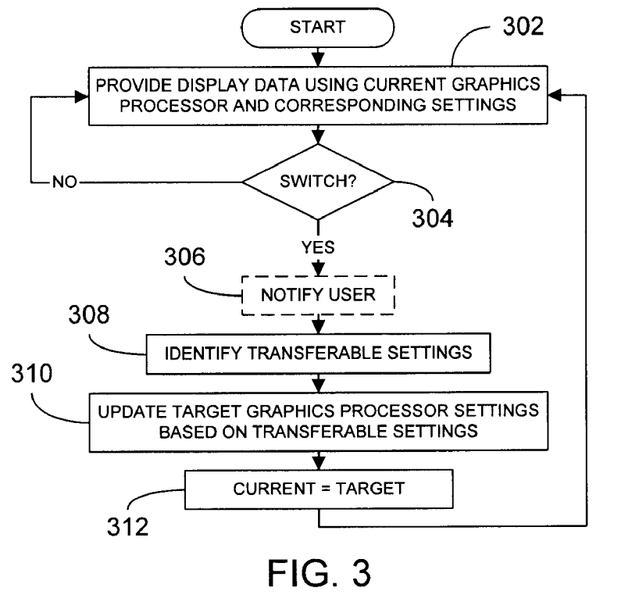
FIG. 3 is flowchart illustrating operation of a device when transitioning operation between two graphics processors in accordance with the present invention.

Referring now to FIG. 3, a flowchart illustrating operation of a device in accordance with one embodiment of the present invention is illustrated. Unless otherwise noted, the processing illustrated in FIG. 3 is preferably implemented using one or more processors operated under control with executable instructions stored in suitable memory devices. However, as is known to those having ordinary skill in the art, other implementation techniques may be equally employed, such as programmable logic arrays, ASICs, state machines, etc.

At block 302, display data is provided using a current graphics processor and corresponding settings. Techniques for providing display data to a display using a graphics processor are well known to those having ordinary skill in the art. Thereafter, at block 304, it is determined whether the device has switched or is about to switch from the current graphics processor to a second or target graphics processor. If not, processing continues at block 302 such that checks for transitions in operations are continuously performed. If, however, at block 304 it is determined that operation has switched or is about to switch to a second graphics processor, processing continues optionally at block 306 where a notification of the transition may be provided to a user of the device. Thereafter, transferable settings may be identified at block 308 and the settings corresponding to the target or second graphics processor updated based on the transferable settings at block 310. The processing illustrated in FIG. 3 assumes that the transfer of settings (where possible) has been enabled for the device. As described below with particular reference to FIGS. 9 and 10, various techniques may be employed to control enablement/disablement of settings transferability, for example, on either a "global" or individual setting basis.

As noted above, any of several techniques may be used to identify the transferable settings. Likewise, in a presently preferred embodiment, there are a variety techniques that updated settings based on the transferable settings may be provided. For example, where settings are identical both in function (i.e., on the effect the setting has on each co-processor) and in range (i.e., the possible values that the setting may take) on both graphics processors, no translation is required and the changed value from the first graphics processor is directly transferred to the second graphics processor. In a similar vein, where the setting is identical in function but has different range for each co-processor, scaling or shifting may be employed. For example, if the setting is represented by a continuum of values and the minimum and/or maximum values are different, a mathematical formula is used to scale and shift the range from the first co-processor to the second. Further still, where the setting is represented on both co-processors by sets of discrete, but different, values, one of two approaches may be used. In one instance, a mapping is created whereby the closest approximate setting value for the second graphics processor is used to represent the setting value taken from the first graphics processor setting value. In these situations, care must be taken to prevent "walking" whereby repeated approximations result in successively different values. To this end, one approach is to maintain a high precision copy that is not subject to round off error. Another is to take the current value corresponding to the second co-processor and map it into the requested (untransformed) value from the first co-processor. If the values match with a certain tolerance, it is assumed that no change is needed because the current value is a close enough match.

Situations may also arise where the range of values for a setting on one co-processor are identical to only a subset of the range of values for the setting on the other co-processor. In these instances, it may be desirable to map the highest (or lowest, as the case may be) setting on the one co-processor to the highest (or lowest) setting on the other co-processor. For example an integrated graphics processor may support 1×, 2×, and 4× anti-aliasing where-as the discrete graphics processor may support 1×, 2×, 4× and 8×. In this case the 4× setting on integrated processor may be mapped to the 8× setting on the discrete processor. In this case the translation would interpret the selection of "4×" on the integrated part as selecting the maximum possible value and translate it accordingly. A user setting in the control panel can provide guidance to the translation system as to whether to take this aggressive approach to translation or take a more literal one. Alternatively, the control panels for each co-processor may include "Min" and "Max" settings that explicitly cause transfers to occur in this fashion. Thus, the control panel interface would include positions (on the first controller) for "Min, 1×, 2×, 4×, Max" (where "Min" is equivalent to 1× and "Max" is equivalent to 4×). Conversely, the second control panel interface would display "Min, 1×, 2×, 4×, 8×, Max" where "Max" in this case is 8×. Selecting "Min" or "Max" would always result in selection of the minimum or maximum available setting, respectively, on the current co-processor.

In an instance where the first graphics processor represents a setting with a continuum of values but the second graphics processor is less flexible and only supports discrete settings, a nearest approximation of the continuum is used on the second graphics processor. Depending on the nature of the setting, such mapping may be linear or non-linear. Once again, the techniques described above to prevent "walking" of values may be applied in this situation.

Referring once again to FIG. 3, after updating settings on the target graphics processor, possibly using one or more of the transformation techniques described in the preceding paragraphs, processing continues at block 312 where the target graphics processor is designated as the current graphics processor, thereby effectively completing transition to the second graphics processor. Additionally at block 312, any change indicators used in the process of identifying transferable settings may be cleared such that subsequent changes to settings will be detected the next time a transition between processors is detected. The process illustrated in FIG. 3 is thereafter repeated at block 302 using the target (now current) graphics processor to process display data based on the corresponding settings. In this manner, settings between graphics processors may be transparently (or nearly so) transferred between co-processors, thereby resulting in better user experience.

FIG. 4 is an exemplary illustration of processing that may be performed on graphics settings in accordance with the present invention. In particular, a plurality of settings 402 associated with a first graphics processor are shown along with corresponding change indicators 408. Likewise, a plurality of settings 404 corresponding to a second graphics processor along with their corresponding change indicators 410 are also shown. As noted above, there are generally three situations concerning settings for a given graphics processor. In particular, such settings may be directly transferable, may require translation or transformation of some sort, or may have no counterparts between graphics processors. For example, as illustrated in FIG. 4, a first setting $C_1$ associated with the current graphics processor may be directly applied to a corresponding setting, $T_1$, associated with the second graphics processor, i.e., the settings are identical in function and range. Alternatively, other settings, such as a third setting, $C_3$, associated with the first graphics processor may require translation 406a prior to being applied to the corresponding setting $T_3$, of the second graphics processor. Further still, certain settings of either the first or second graphics processor may have no corresponding setting, as illustrated for example by the second setting, $C_2$, associated with the first graphics processor. As a result, it is noted that the number of possible settings between graphics processors need not be identical, e.g., the first graphics processor employs a total of N settings whereas the second graphics processor employs a total of $M \neq N$ settings.

It may be possible or desirable to perform transfers of settings (and any necessary transformations of such settings) each time a transition between graphics processors occurs. In a presently preferred embodiment, however, only those settings that have changed for the current graphics processor need to be transferred upon transition between processors. For example, as shown in FIG. 4, although a significant number of settings associated with the first graphics processor are otherwise transferable to the settings associated with the second graphics processor, only those settings in which the corresponding change indicator 408 is set are actually transferred.

Figure 5:
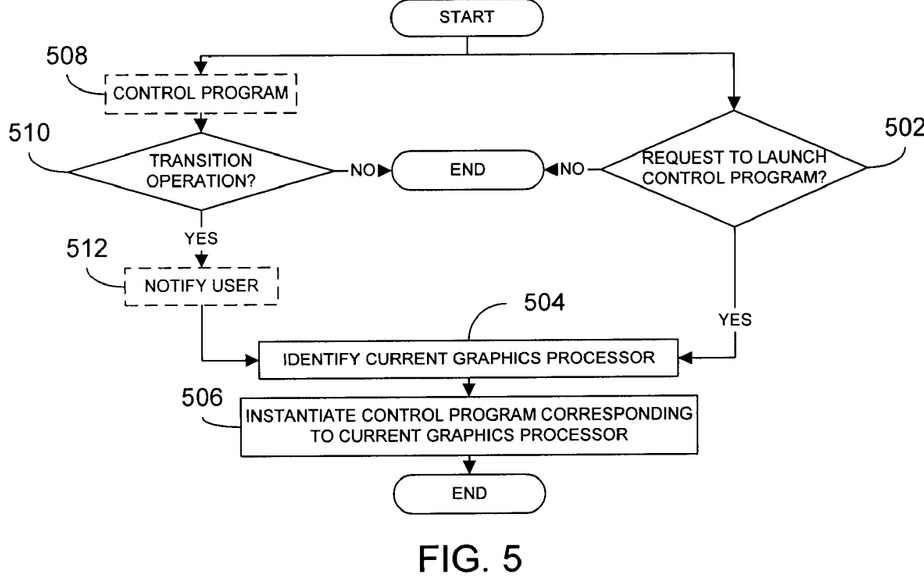
FIG. 5 is a flowchart illustrating operation of a device when instantiating a graphics processor control program in accordance with the present invention.

Referring now to FIG. 5, a flow chart illustrating operations used to instantiate a graphics processor control program in accordance with the present invention is shown. Once again, the processing illustrated in FIG. 5 is preferably carried out using a suitably programmed processor such as the application processor 102 illustrated in FIG. 1. However, as known to those having skill in the art, other implementation techniques may be equally employed. Two parallel paths are illustrated in FIG. 5. Along a first of the parallel paths, it is determined whether a request to launch a control program has been received at block 502. As noted above, such a request may be explicitly provided by a user of a device. When such a request has been received, processing continues at block 504 where a current (i.e., currently active) graphics processor is identified. Thereafter, at block 506, a control program corresponding to the currently active graphics processor is instantiated. In this manner, requests input by a user of a device to launch a graphics processor control program are assured of launching the correct current graphics processor control program regardless of the currently active graphics processor.

Along the second, alternative parallel path, the correct graphics processor control program may be instantiated not in response to a request input by a user, but in response to detecting a transition in operation, as further illustrated by blocks 508 through 512. In particular, at block 508, a control program for a currently active graphics processor may already be instantiated. Regardless, at block 510 it is determined whether operation between a current graphics processor and a target graphics processor is in transition. If so, processing optionally continues at block 512 where a user of the device is notified of the transition. Thereafter, processing continues at blocks 504 and 506 as previously described.

Figure 6:
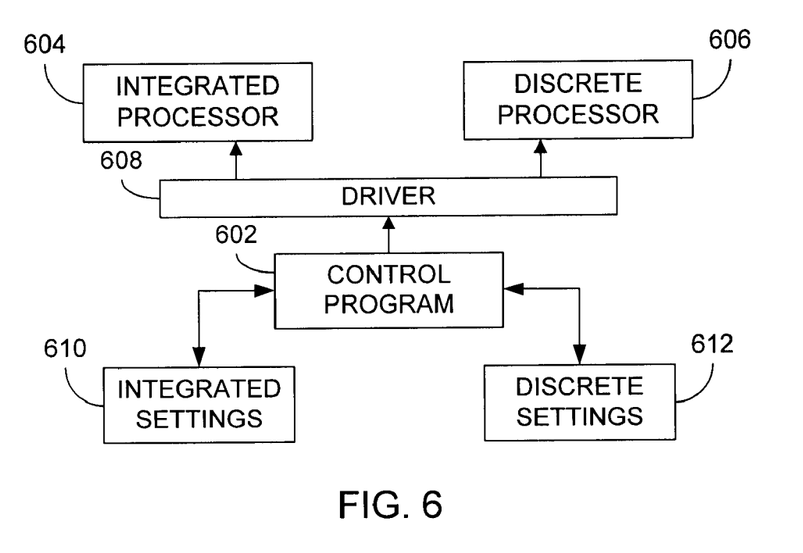
FIG. 6 is a schematic block diagram of an implementation of the present invention in a device using a single control program in conjunction with multiple graphics processors.

Referring now to FIG. 6, an implementation of the present invention using a single control program in conjunction with multiple graphics processors is further illustrated. In particular, a control program 602 communicates with both an integrated graphics processor 604 and a discrete graphics processor 606 via a suitable driver 608. As known in the art, the driver 608 is a software program that allows the control program 602 to communicate directly with the respective graphics processors 604, 606. The control program 602 also interacts with corresponding integrated settings 610 as well as corresponding discrete setting 612, for example, when updating one of the user-configurable settings 610, 612 or providing the setting values to the respective graphics processor 604, 606. The implementation illustrated in FIG. 6 may occur, for example, in those cases where the integrated graphics processor 604 and discrete graphics processor 606 are provided by the same device manufacturer. In this case, the driver 608 can be authored to interact with both graphics processors 604, 606.

Figure 7:
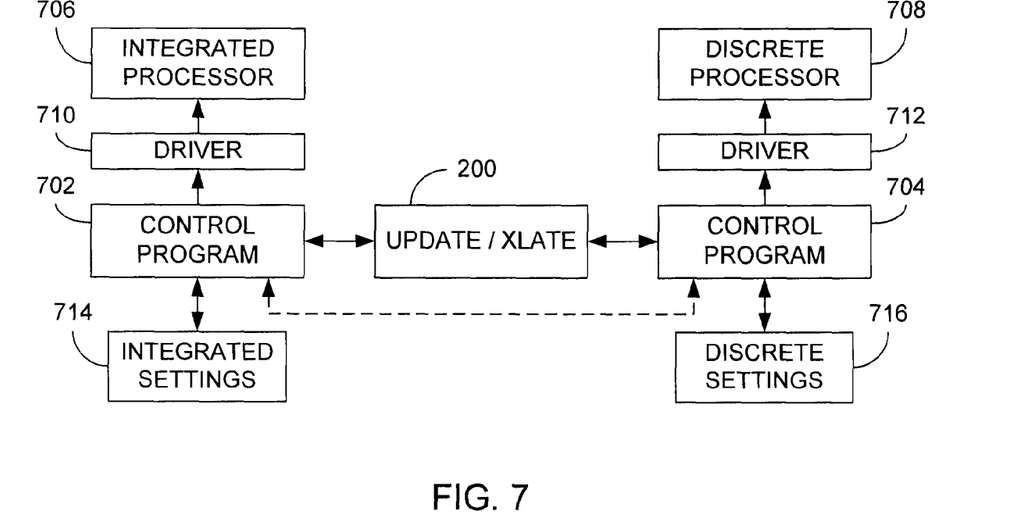
FIG. 7 is a schematic block diagram of an implementation of the present invention in a device using multiple control programs in conjunction with multiple graphics processors.

In contrast, FIG. 7 illustrates an implementation of the present invention using multiple control programs in conjunction with multiple graphics processors. In this instance, a first control program 702 communicates with a corresponding integrated graphics processor 706 via a suitable driver 710. Likewise, the control program 702 interacts with the integrated settings 714 corresponding to the integrated graphics processor 706. In parallel, a second control program 704 communicates with a discrete graphics processor 708 via another suitable driver 712. Likewise, the second control program 704 communicates with discrete settings 716 as shown. As further illustrated, an update/translation block 200 (as previously described above) may be employed when transferring settings between graphics processors.

In responding to graphics processor change and translating or transferring settings from one graphics processor to another, and where different control panels/applications are used for the two different graphics processors, there are several methods that may be used to set values in the second application. For example, if the control panel/application supports a software development kit (SDK) which allows Get/Set/Validate interactions, as known in the art, then these interactions can be used to transfer values. If the control panel/application supports a defined configuration file, then the translated values can be mapped into that configuration file and written there prior to launching the control panel application. In a similar vein, if the control panel/application supports a defined system registry specification, then the translated values can be mapped into that specification and written to the registry prior to launching the control panel application. If the control panel/application supports a command line for setting initial values, then that mechanism can be used to pass the translated settings to the second control panel/application. Further still, settings can be scripted into the user interface by simulating mouse moves, clicks and other user entry input that would normally be used to enter values for user-configurable settings. Finally, at times, transfer in one direction may be possible but transfer of settings back to the first control program may be difficult or impossible. In cases where a configuration file or registry is used, it is possible to make a backup of the second application's settings and compare that backup to the new values when the system switches back to the first graphics processor. In this case a "reverse mapping" (i.e., reversing the transformations/translations described above) is used.

Figure 8:
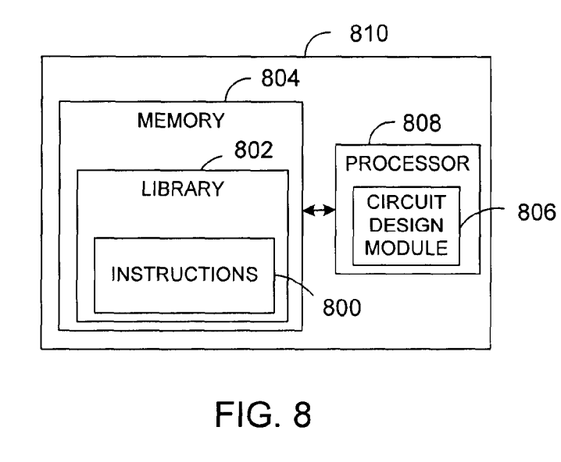
FIG. 8 is an block diagram of an exemplary hardware design that may be used to implement the present invention.

Referring now to FIG. 8, the processing described in accordance with the present invention may be embodied in a hardware-based implementation, such as an integrated circuit. To this end, as known by those of skill in the art, a set of executable instruction 800 may be defined and stored within a library 802 that, in turn, is stored in memory 804. The instructions 800, which may comprise instructions represented in any suitable hardware design language (HDL) including, but not limited to, Verilog or another hardware representation such as GDSII, can be used by a circuit design module 806 that is executed on a processor 808 of an integrated circuit design system 810. Using the instructions 800, the system 810 may employed to create a suitable integrated circuit (or other hardware embodiment) capable of performing the processing described herein. Such system 810 and circuit design module 806 may be any suitable system and integrated circuit design program as known to those skilled in the art.

Figure 9:
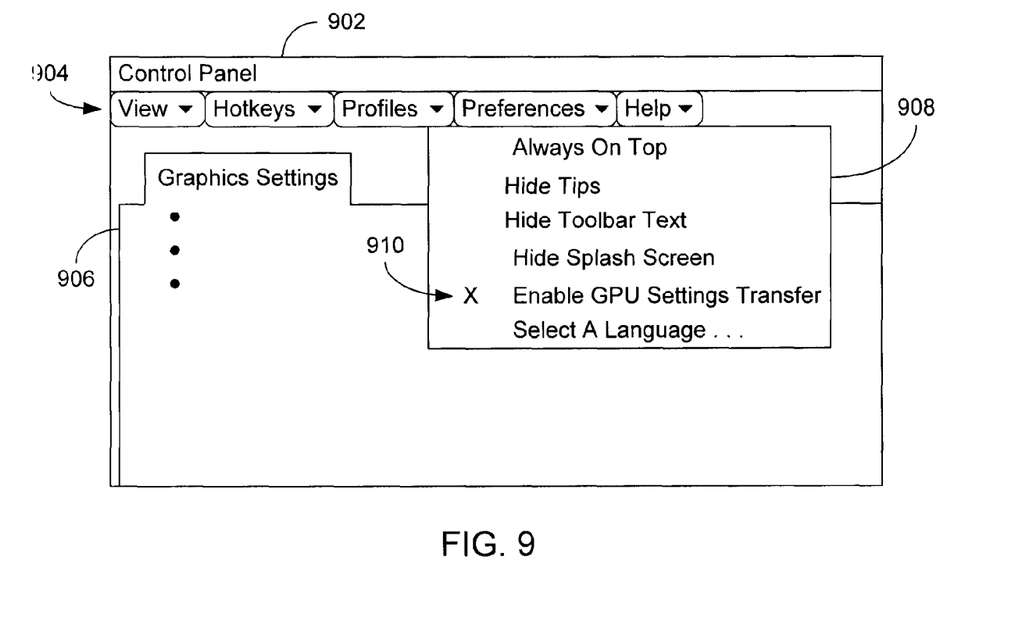
FIG. 9 is an illustration of a control panel interface that may be used in conjunction with an embodiment of the present invention.

Referring now to FIG. 9, an exemplary control panel interface that may be used in connection with the various embodiments described above is further illustrated. Techniques for implementing such control panel interfaces are well know to those having skill in the art. As shown, the control panel 902 comprises a plurality of menu buttons 904 that are user-selectable (using, for example, one of the user input devices 114). Additionally, a selectable tab 906 is illustrated for completeness. Upon selection of one of the menu buttons 904 (in the illustrated example, the "Preferences" menu button), a drop menu 908 is provided comprising a number of menu items including a global settings transfer enablement mechanism 910 (labeled "Enable GPU Settings Transfer"). Selection of the enablement mechanism 910 causes the display of the enablement mechanism 910 to be updated to reflect its current state, i.e., selected (enabled) or deselected (disabled). In the example shown, the enablement mechanism 910 is currently selected (as illustrated by the "X") indicating that settings transfer functionality, as described above, has been enabled for all transferable settings. Subsequent de-selection of the enablement mechanism 910 will cause the settings transfer functionality to be disabled such that the settings for each graphics process must be independently controller. It is understood that the polarity of the enablement mechanism 910 could be reversed such that selection thereof will cause the transfer functionality to be disabled, and vice versa.

Figure 10:
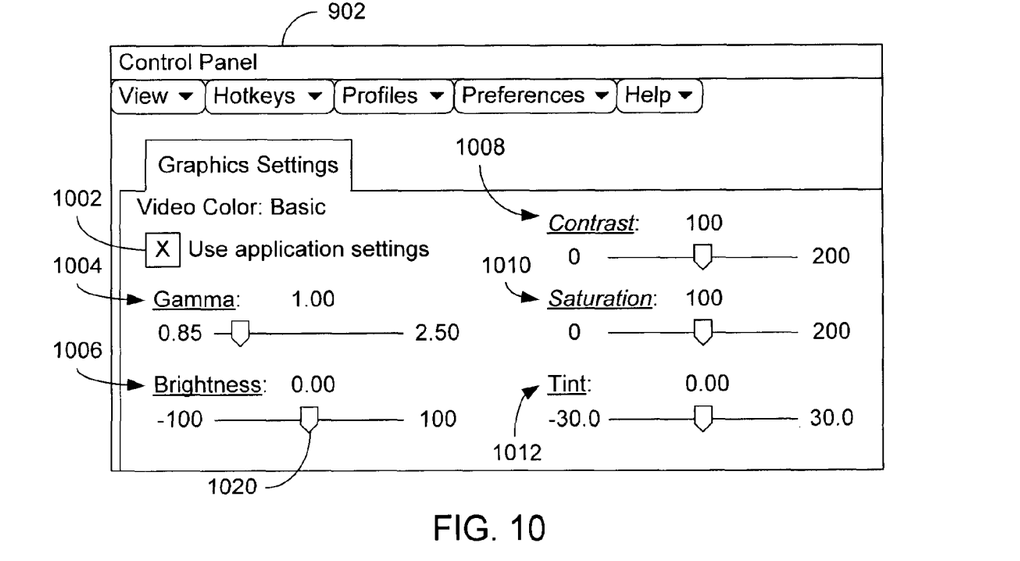
FIG. 10 is an illustration of another control panel interface that may be used in conjunction with an embodiment of the present invention.

An additional interface embodiment is illustrated in FIG. 10 particularly directed to techniques for controlling individual settings. In this embodiment, it is assumed that individual settings may exist in one of three possible states: not transferable; transferable and not enabled, and transferable and enabled. Those of skill in the art will appreciate that other states may be readily derived. Given these states, the illustrated embodiment makes use a transfer state indicator to depict the current state of a given setting. For example, a first setting 1002 ("Use application setting") is shown as being rendered in a normal, default font. In this case, the default font is indicative of the setting falling into the "not transferable" state. On the other hand, each of the other settings 1004-1012 are rendered in an underlined font, indicating that the corresponding setting is transferable. Thus, in the illustrated example, each of the Gamma setting 1004, Brightness setting 1006, Contrast setting 1008, Saturation setting 1010 and Tint setting 1012 is separately transferable as described above. As further shown, slider controls 1020 are provided to select particular values for each setting, which values are also displayed.

For those settings that are transferable, the enabled or disabled transferability of the setting is further reflected based on whether the rendered font is italicized. Thus, a transferable setting that is not italicized is an indication that transfer for the corresponding setting has been enabled, whereas an italicized font is an indication that transfer of the setting has not been enabled. In this manner, a user is able to readily determine the operational status of each setting. It is understood that the particular indicators described herein (i.e., default, underlined, italicized fonts) are but one example of the various schemes that may be employed for this purpose. For example, the use of specific colors, animation, font sizing or positioning, separate graphical indicators, etc. could be equally employed.

Furthermore, each of the separate settings could be rendered in a manner that allows them to be individually controllable. For example, by "right-clicking" on the textual label for each setting, a user may be presented with a menu that allows the user to enable/disable the transfer of a particular setting. Further still, it will be appreciated that the global control 910 and individual control 1002-1012 described herein could be used to modify the state of settings previously established by the other mechanism. For example, if the enablement mechanism 910 is used to enable transfer of all possible settings, subsequent disablement of a particular setting through the individual setting mechanism could be employed to more finely control overall operation. Conversely, previously configured individual settings could be overruled through the global enable/disable functionality of the enablement mechanism 910.

As described above, the present invention provides techniques for handling graphics processor settings in devices comprising at least two graphics processors. This is achieved by identifying transferable settings (preferably as a result of being changed) from the settings of the current or first co-processor and providing updated settings for the target or second co-processor. Where necessary, translations or transformations may be applied to the settings. Using, for example, a graphical user interface, the particular state of settings may be controlled on a global and/or individual basis. Regardless, using the techniques of the present invention, a better user experience may be provided to the extent that users are shielded from and made unaware of (unless desired otherwise) transitions between co-processors, such as graphics processors. For at least these reasons, the present invention represents an advancement over prior art techniques.

It is therefore contemplated that the present invention cover any and all modifications, variations or equivalents that fall within the spirit and scope of the basic underlying principles disclosed above and claimed herein.

What is claimed is:

1. In a device comprising at least two graphics processors, a method for transitioning operation between graphics processors of the at least two graphics processors, the method comprising:
   determining that the device has switched to a second graphics processor of the at least two graphics processors from a first graphics processor of the at least two graphics processors;
   identifying at least a portion of settings corresponding to the first graphics processor to be applied to the second graphics processor to provide transferable settings; and
   updating settings corresponding to the second graphics processor based on the transferable settings to provide updated settings.

2. The method of claim 1, wherein identifying the transferable settings further comprises identifying those settings corresponding to the first graphics processor that have been changed.

3. The method of claim 2, wherein identifying those settings corresponding to the first graphics processor that have been changed further comprises checking, for at least some settings corresponding to the first graphics processor, a change indicator.

4. The method of claim 3, further comprising, upon updating the settings corresponding to the second graphics processor:
   resetting the change indicator for each setting corresponding to the first graphics processor.

5. The method of claim 1, wherein the device further comprises a display in communication with any of the at least two graphics processors, further comprising:
provide, by the second graphics processor, display data to the display based on the updated settings.

6. The method of claim 1, wherein updating settings corresponding to the second graphics processor based on the transferable settings further comprises:
replacing ones of the settings corresponding to the second graphics processor with corresponding ones of the transferable settings.

7. The method of claim 1, wherein updating settings corresponding to the second graphics processor based on the transferable settings further comprises:
transforming at least one of the transferable settings to provide at least one transformed setting; and
replacing ones of the settings corresponding to the second graphics processor with corresponding ones of the at least one transformed settings.

8. The method of claim 1, further comprising:
determining that the device has switched to the first graphics processor;
identifying at least a portion of settings corresponding to the second graphics processor that are to be applied to the first graphics processor to provide additional transferable settings; and
updating settings corresponding to the first graphics processor based on the additional transferable settings to provide additional updated settings.

9. The method of claim 1, wherein the switch to the second graphics processor is caused by a change in power condition of the device.

10. In a device comprising at least two graphics processors and at least two graphics processor control programs uniquely associated therewith, a method for controlling operation of the at least two graphics processors, the method comprising:
identifying a currently active graphics processor of the at least two graphics processors; and
instantiating a current graphics processor control program of the at least two graphics processor control programs, wherein the current graphics processor control program is associated with the currently active graphics processor.

11. The method of claim 10, further comprising:
receiving a request to launch a graphics processor control program of the at least two graphics processor control programs,
wherein identifying the currently active graphics processor is in response to the request.

12. The method of claim 10, further comprising:
determining that the device has transitioned operation from a first graphics processor of the at least two graphics processors to a second graphics processor of the at least two graphics processors,
wherein identifying the currently active graphics processor is in response to determining that the device has transitioned operation from the first graphics processor to the second graphics processor.

13. The method of claim 12, further comprising:
notifying a user of the device that the device has transitioned operation from the first graphics processor to the second graphics processor.

14. A device comprising at least two graphics processors and capable of transitioning operation between graphics processors of the at least two graphics processors, and further comprising:

an active graphics processor determiner operative to provide a switch indicator when operation has transferred from a first graphics processor of the at least two graphics processors to a second graphics processor of the at least two graphics processors;
a transferable settings identifier, in communication with the active graphics processor determiner and responsive to the switch indicator, operative to identify at least a portion of settings corresponding to the first graphics processor to be applied to the second graphics processor to provide transferable settings; and
an update controller, in communication with the transferable settings identifier, operative to update settings corresponding to the second graphics processor based on the transferable settings to provide updated settings.

15. The device of claim 14, wherein the transferable settings identifier is further operative to identify the transferable settings by identifying those settings corresponding to the first graphics processor that have been changed.

16. The device of claim 15, wherein the transferable settings identifier is further operative to identify those settings corresponding to the first graphics processor that have been changed by checking, for each setting corresponding to the first graphics processor, a change indicator and, upon updating the settings corresponding to the second graphics processor, to reset the change indicator for each setting corresponding to the first graphics processor.

17. The device of claim 14, further comprising a display in communication with any of the at least two graphics processors, and wherein the second graphics processor is operative to provide display data to the display based on the updated settings.

18. The device of claim 14, wherein the update controller is further operative to update settings corresponding to the second graphics processor based on the transferable settings by replacing ones of the settings corresponding to the second graphics processor with corresponding ones of the transferable settings.

19. The device of claim 14, wherein the update controller is further operative to update settings corresponding to the second graphics processor based on the transferable settings by:
transforming at least one of the transferable settings to provide at least one transformed setting; and
replacing ones of the settings corresponding to the second graphics processor with corresponding ones of the at least one transformed settings.

20. The device of claim 14, wherein the active graphics processor determiner is further operative to determine that the device has switched to the first graphics processor, and wherein the transferable settings identifier is further operative to identify at least a portion of settings corresponding to the second graphics processor that are to be applied to the first graphics processor to provide additional transferable settings, and wherein the update controller is further operative to update settings corresponding to the first graphics processor based on the additional transferable settings to provide additional updated settings.

21. The device of claim 14, wherein the active graphics processor determiner comprises a power condition monitor operative to provide the switch indication responsive to a change in power condition of the device.

22. A non-transitory processor-readable medium having stored thereon executable instructions that, when executed, configure a device, comprising at least two graphics processors and capable of transitioning operation between graphics processors of the at least two graphics processors, to:

determine that the device has switched to a second graphics processor of the at least two graphics processors from a first graphics processor of the at least two graphics processors;

identify at least a portion of settings corresponding to the first graphics processor to be applied to the second graphics processor to provide transferable settings; and update settings corresponding to the second graphics processor based on the transferable settings to provide updated settings.

23. The non-transitory processor-readable medium of claim 22, wherein the executable instruction that, when executed by the processor, cause the process to identify the transferable settings further comprise executable instructions that, when executed by the processor, cause the processor to identify those settings corresponding to the first graphics processor that have been changed.

24. The non-transitory processor-readable medium of claim 23, wherein the executable instruction that, when executed by the processor, cause the process to identify those settings corresponding to the first graphics processor that have been changed further comprise executable instructions that, when executed by the processor, cause the processor to check, for each setting corresponding to the first graphics processor, a change indicator and, upon updating the settings corresponding to the second graphics processor, to reset the change indicator for each setting corresponding to the first graphics processor.

25. The non-transitory processor-readable medium of claim 22, further comprising processor-executable instructions that, when executed by the processor, cause the processor to:

provide display data, based on the updated settings, to a display in communication with any of the at least two graphics processors.

26. The non-transitory processor-readable medium of claim 22, wherein the executable instruction that, when executed by the processor, cause the process to update the settings corresponding to the second graphics processor based on the transferable settings further comprise executable instructions that, when executed by the processor, cause the processor to:

replace ones of the settings corresponding to the second graphics processor with corresponding ones of the transferable settings.

27. The non-transitory processor-readable medium of claim 22, wherein the executable instruction that, when executed by the processor, cause the process to update the settings corresponding to the second graphics processor based on the transferable settings further comprise executable instructions that, when executed by the processor, cause the processor to:

transform at least one of the transferable settings to provide at least one transformed setting; and replace ones of the settings corresponding to the second graphics processor with corresponding ones of the at least one transformed settings.

28. The non-transitory processor-readable medium of claim 22, further comprising processor-executable instructions that, when executed by the processor, cause the processor to:

determine that the device has switched to the first graphics processor;

identify at least a portion of settings corresponding to the second graphics processor that are to be applied to the first graphics processor to provide additional transferable settings; and update settings corresponding to the first graphics processor based on the additional transferable settings to provide additional updated settings.

29. A device comprising at least two graphics processors and capable of transitioning operation between graphics processors of the at least two graphics processors, and at least two graphics processor control programs uniquely associated therewith, the device further comprising:

an active graphics processor determiner operative to provide an identification of a currently active graphics processor of the at least two graphics processors; and a control program selector, in communication with the active graphics processor determiner, operative to instantiate, in response to the identification, a current graphics processor control program of the at least two graphics processor control programs, wherein the current graphics processor control program is associated with the currently active graphics processor.

30. The device of claim 29, further comprising:

a request input mechanism, in communication with the active graphics processor determiner, operative to receive a request to launch a graphics processor control program of the at least two graphics processor control programs, wherein the active graphics processor determiner is further operative to determine the currently active graphics processor is in response to the request.

31. The device of claim 29, wherein the active graphics processor determiner is further operative to provide the identification when the device has transitioned operation from a first graphics processor of the at least two graphics processors to a second graphics processor of the at least two graphics processors.

32. The device of claim 31, further comprising:

a user output mechanism, in communication with the active graphics processor determiner, operative to notify a user of the device that the device has transitioned operation from the first graphics processor to the second graphics processor.

33. A non-transitory processor-readable medium having stored thereon executable instructions that, when executed, configure a device, comprising at least two graphics processors and capable of transitioning operation between graphics processors of the at least two graphics processors, to:

identify a currently active graphics processor of the at least two graphics processors; and instantiate a current graphics processor control program of at least two graphics processor control programs uniquely associated with the at least two graphics processors, wherein the current graphics processor control program is associated with the currently active graphics processor.

34. The non-transitory processor-readable medium of claim 33, further comprising executable instructions that, when executed, configure the device to:

receive a request to launch a graphics processor control program of the at least two graphics processor control programs, wherein the currently active graphics processor is identified in response to the request.

35. The non-transitory processor-readable medium of claim 33, further comprising executable instructions that, when executed, configure the device to:

determine that the device has transitioned operation from a first graphics processor of the at least two graphics processors to a second graphics processor of the at least two graphics processors, wherein the currently active graphics processor is identified in response to the determination that the device has transitioned operation from the first graphics processor to the second graphics processor.

36. The non-transitory processor-readable medium of claim 35, further comprising executable instructions that, when executed, configure the device to:
notify a user of the device that the device has transitioned operation from the first graphics processor to the second graphics processor.

37. In a computing system having a graphical user interface including a display and a user selection device, a method for controlling operation of at least two graphics processors, the method comprising:
providing, on the display, a global settings transfer enablement mechanism;
receiving, via the user selection device and the global settings transfer enablement mechanism, a user selection input; and
controlling operation of the at least two graphics processors based on the first selection input, wherein the user selection input is used to determine whether transferable settings are to be used for the at least two graphics processors.

38. In a computing system having a graphical user interface including a display and a user selection device, a method for indicating operational status of at least two graphics processors to a user of the computing system, the method comprising:
providing, on the display, a transfer state indicator of a setting, the setting being applicable to at least some of the at least two graphics processors.

39. The method of claim 38, further comprising:
providing, on the display, an individual setting transfer enablement mechanism corresponding to the setting;
receiving, via the user selection device and the individual setting transfer enablement mechanism, a first user selection input, wherein the first user selection input is used to determine whether the setting will be transferred between the at least two graphics processors.

40. The method of claim 39, further comprising:
modifying, on the display, appearance of the transfer state indicator in response to the first user selection input.

* * * * *